May 11, 1937.  L. H. FITCH, JR., ET AL  2,079,934
PROCESS FOR THE CATALYTIC TREATMENT OF GASOLINE
Filed Oct. 8, 1934
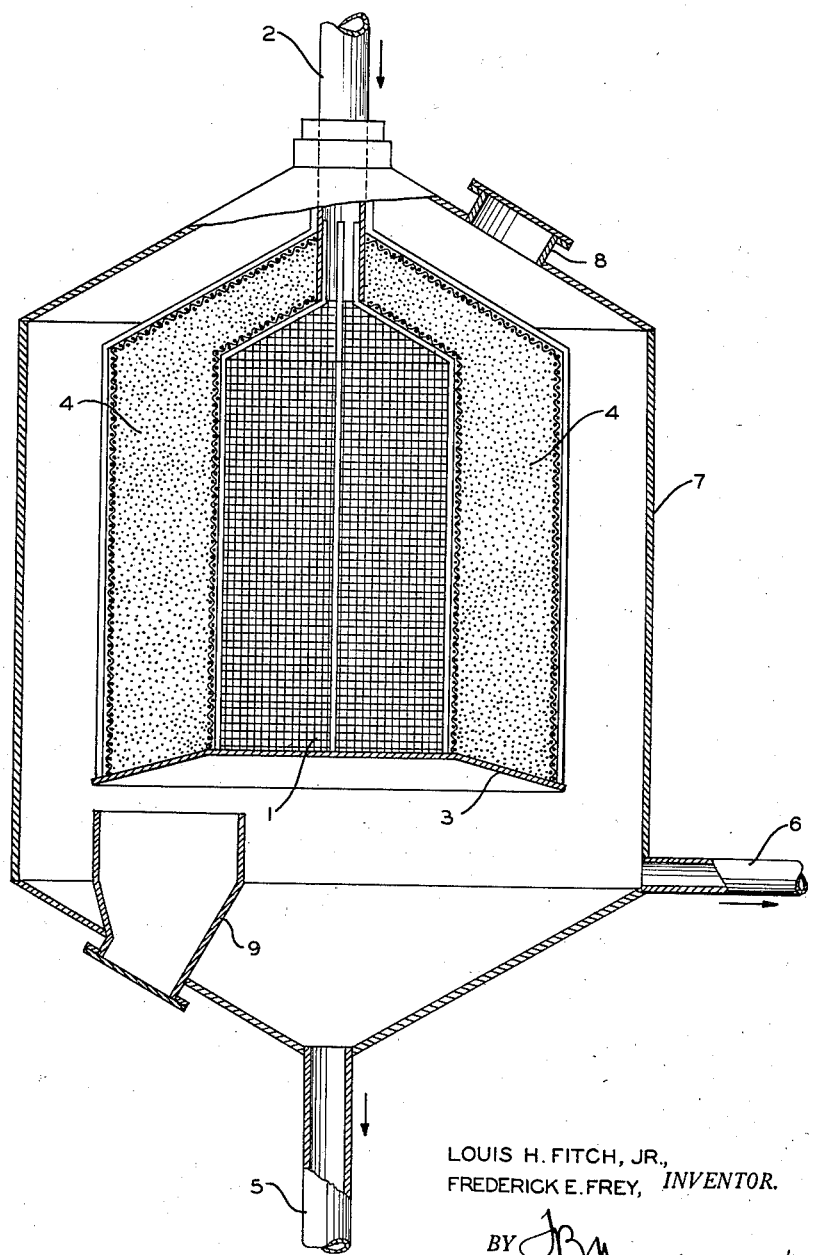
LOUIS H. FITCH, JR.,
FREDERICK E. FREY, INVENTOR.
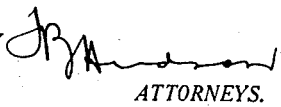
ATTORNEYS.

Patented May 11, 1937

2,079,934

UNITED STATES PATENT OFFICE 2,079,934

PROCESS FOR THE CATALYTIC TREATMENT OF GASOLINE

Louis H. Fitch, Jr., and Frederick E. Frey, Bartlesville, Okla.; The First National Bank in Bartlesville, administrator of said Louis H. Fitch, Jr., deceased, assignors to Phillips Petroleum Company, a corporation of Delaware Application October 8, 1934, Serial No. 747,458

2 Claims. (Cl. 196—96)

This invention relates to the improvement of color and gum content in petroleum distillates by contacting them in vapor or mixed phase with solid adsorbent catalytic materials.

It is well known that the color of gasolines and similar materials may be improved, and their gumming tendency lowered by contacting them at somewhat elevated temperatures with adsorbent materials such as fuller's earth, silica gel or the like. Such contact, as ordinarily effected at low pressures, is accomplished by passing the hot gasoline vapors, as they come from the top of a fractionator, through a bed of the adsorbent catalytic material. In the course of such passage, as the result of polymerization and heat loss, liquids are formed in the bed of catalytic material, and these liquids normally drain through the bed of catalytic material, so that contact is effected in a mixed, or vapor and liquid phase.

We have found that the life of the catalytic material in such a process can be extended materially by using centrifugal force to reduce the time of contact of the catalytic material with substances in the liquid phase. While the reason for this is not certain, it appears probable that, as the process is ordinarily conducted, the hydrocarbons in the liquid phase remain in contact with the catalytic material for a much more extended period than those which pass through the catalytic material as vapor, and we have found that this is undesirable, leading to overpolymerization of certain constituents of the liquids with consequent deterioration of the catalytic material due to its becoming loaded with substances of excessively high molecular weight.

More specifically, the invention consists in a process for treating hydrocarbon distillates to improve their color, stability and other properties, by passing them radially outward through a rotating body of solid catalytic treating material of the type of clays, fuller's earth, silica gel, or other suitable solid adsorbent. We thus use the action of centrifugal force to free the catalytic material of polymers and substances in the liquid phase more rapidly than is the case in conventional processes of this type.

One embodiment of our invention is shown in the accompanying drawing, in which 1 is a cylindrical chamber with perforated side walls, suspended from the hollow tube 2 in such manner as to permit its being rotated about its axis while vapors are simultaneously being passed into the chamber through the tube 2. Surrounding the chamber 1, and attached thereto, is another cylindrical chamber with walls perforated or otherwise so constructed as to permit the ready passage of gases and liquids, while retaining therein the catalytic material 4. These concentric chambers holding the catalytic material in place are surrounded by a substantially vapor-tight shell 7, from which vapors and liquids may be withdrawn through the pipe 5, or, alternatively, the liquids and polymers may be separately collected as they drain down the sides of the shell, and withdrawn through the pipe 6, substantially as shown. Manholes for charging or discharging the catalytic material are shown as 8 and 9 respectively on the drawing.

In the operation of our process, petroleum distillates, in vapor or mixed phase, will be passed into the chamber 1 and radially outward through the bed of catalytic material 4 while the said bed of catalytic material is maintained in rotatory motion about a vertical axis by a suitable source of power. Liquid condensates and polymers entering or formed within the bed of catalytic material are rapidly thrown from the catalyst granules and collect on the walls of the vessel 7, from which they drain and are withdrawn either together with, or separately from the outgoing vapors. The vapors may then be condensed or otherwise treated in the customary manner. When used in this manner, a considerably longer life and higher throughput is obtained from a given quantity of the catalytic material. Highly active catalytic materials such as siliceous earths activated by mineral acids which ordinarily effect excessive polymerization may be used in place of fuller's earth and the like and reduced size of the unit or increased capacity obtained.

Many modifications of the process will be apparent. For example, the catalytic material may be so mounted as to be rotated by the force of the hydrocarbon vapors passing through it, or it may be mounted so as to rotate about a horizontal axis, though in general, this would not be found desirable.

We do not intend to limit ourselves to the use of any specific catalytic material, as the increased life of our catalytic material might permit us to use substances ordinarily considered too expensive for this purpose. It is sufficient that the catalytic material should effect an improvement in the quality of hydrocarbon distillates which are passed through it at elevated temperatures. Such distillates will ordinarily be of gasoline or kerosene boiling range, but even higher boiling distillates may be processed if desired.

What we claim is:

1. The process of treating normally liquid petroleum distillates to improve the color and lower the gum forming tendency thereof, which comprises passing the said distillates, partly in the form of vapor, outwardly in substantially radial direction through a cylindrical bed of solid adsorbent catalytic material into a substantially vapor tight shell surrounding but not contiguous to the said cylindrical bed, withdrawing the aforesaid distillates from the said shell, and maintaining the cylindrical bed of catalyst in rotary motion about a substantially vertical axis concentric with the axis of the said cylindrical bed, at such a rate as to exert a substantial component of centrifugal force upon any liquids present in the said cylindrical bed.

2. The process of treating normally liquid petroleum distillates to improve the color and lower the gum-forming tendency thereof, which comprises passing the said distillates, partly in the form of vapor, outwardly in substantially radial direction through a cylindrical bed of solid adsorbent catalytic material into a substantially vapor tight shell surrounding but not contiguous to the said cylindrical bed, withdrawing the aforesaid distillates from the said shell, and maintaining the cylindrical bed of catalyst in rotary motion about an axis concentric with the axis of said cylindrical bed, at such a rate as to exert a substantial component of centrifugal force upon any liquids present in the said cylindrical bed.

LOUIS H. FITCH, Jr.
FREDERICK E. FREY.